United States Patent [19]
Desjardins

[11] 3,885,887
[45] May 27, 1975

[54] FLEXURE FOR BEARINGLESS ROTOR

[75] Inventor: Rene A. Desjardins, Media, Pa.

[73] Assignee: The Boeing Company, Seattle, Wash.

[22] Filed: Dec. 5, 1973

[21] Appl. No.: 421,891

[52] U.S. Cl............................... 416/141; 416/135
[51] Int. Cl....................... B64c 11/12; B64c 27/38
[58] Field of Search ........... 416/141, 135, 136, 138, 416/140

[56] References Cited
UNITED STATES PATENTS

| | | | |
|---|---|---|---|
| 2,047,776 | 7/1936 | Hafner | 416/135 |
| 2,146,367 | 2/1939 | Berliner | 416/138 X |
| 2,672,941 | 3/1954 | Jovanovich | 416/141 |
| 3,297,094 | 1/1967 | Kisovec | 416/134 X |
| 3,310,119 | 3/1967 | Watson | 416/141 UX |
| 3,701,612 | 10/1972 | Breuner | 416/141 |
| 3,762,834 | 10/1973 | Bourquardez et al. | 416/141 X |
| 3,791,234 | 2/1974 | Kastan et al. | 416/241 X |
| 3,807,896 | 4/1974 | Johnson | 416/135 X |

FOREIGN PATENTS OR APPLICATIONS 1,051,476 12/1966 United Kingdom................ 416/141

Primary Examiner—Everette A. Powell, Jr.
Attorney, Agent, or Firm—J. M. Corr; F. L. Neitzke; R. S. Lipton

[57] ABSTRACT

A flexure is provided for bearingless rotors wherein the effective hinge about which rotor blade flapping and lead lap motion occurs may be located at a point less than eight percent of the rotor radius. The flexure is made of three tubular stages connected in series and in an overlapping manner. The first stage is connected to the rotor hub, the second stage is cantilevered inward towards the center of the rotor hub and is connected to the outboard end of the first stage. The third stage is cantilevered outward from the inboard end of the second stage. The rotor blade forms a part of, or is rigidly connected to, the outboard end of the third stage. Each stage bears a concentric relationship to the other stages. The flexure provides a high degree of flexibility compared to other means for connecting a rotor blade to a hub.

5 Claims, 8 Drawing Figures

PATENTED MAY 27 1975

3,885,887

SHEET 1

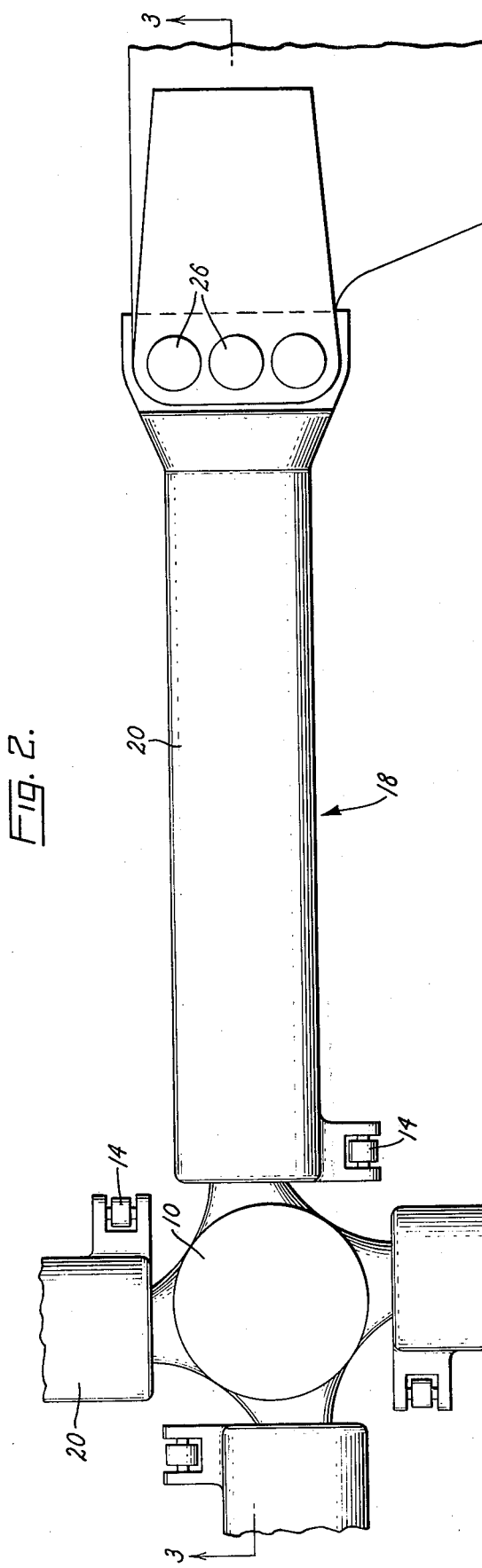
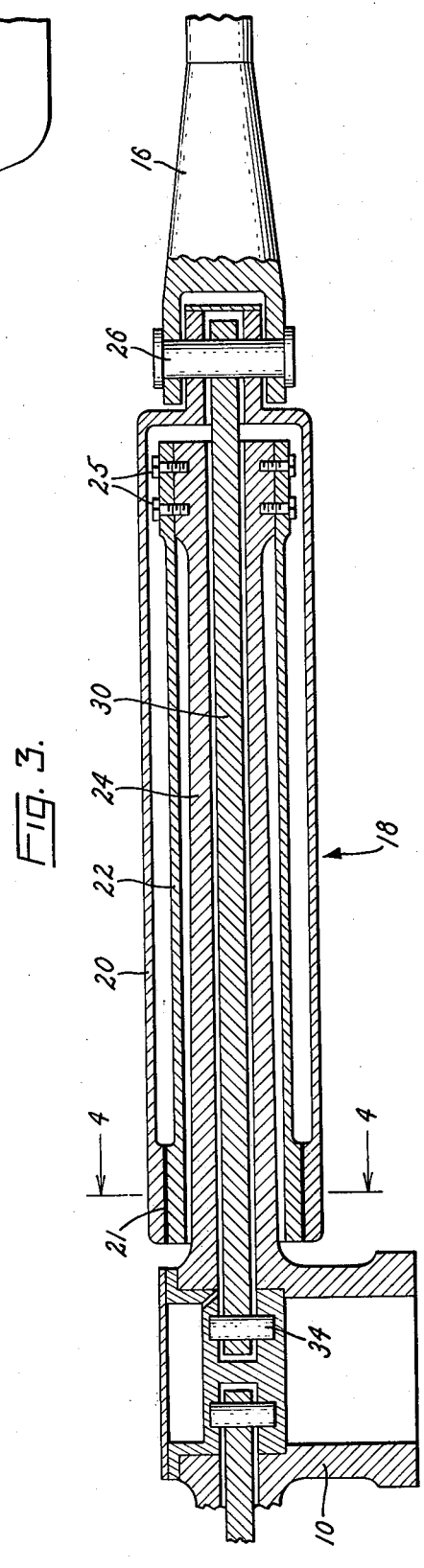

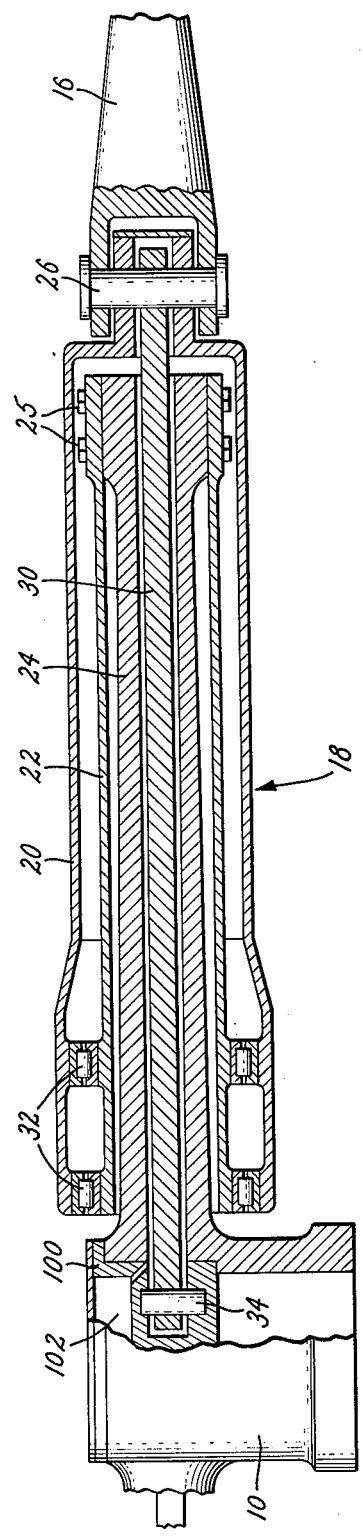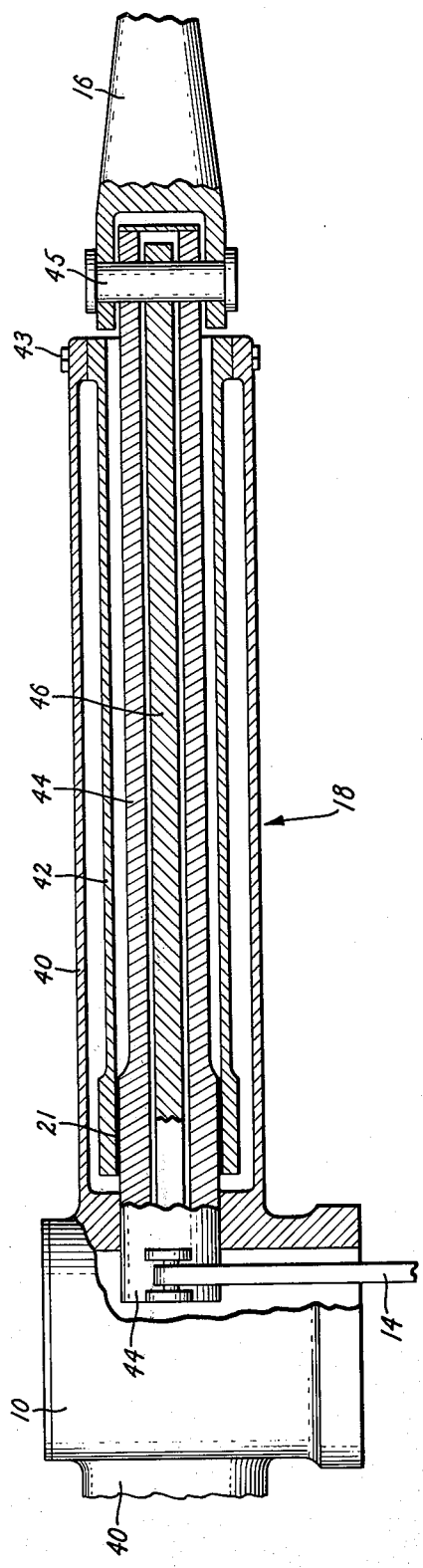

FLEXURE FOR BEARINGLESS ROTOR

BACKGROUND OF THE INVENTION

This invention relates to flexures used to connect rotor blades to the rotor of a rotorcraft, such as a helicopter.

It is well known to those in the helicopter field that rotors for use in helicopters must have blades which are able to oscillate or flex with respect to the rotor hub of the aircraft. These oscillations or flexing must take place in three different directions or about three different axes. Flexing of the blade in and out of the plane of rotation about a substantially horizontal axis is referred to as flapping. Flexing in the plane of rotation about a substantially vertical axis is known as lead lag. Flexing of the blade about its longitudinal axis is known as pitching. The flexure of the present invention is advantageous with respect to problems connected with the three modes of flexing but finds its greatest advantage in overcoming problems associated with flexing in the flapping mode.

Flapping motions of helicopter rotor blades are particularly important in controlling the aircraft's attitude in flight. The degree of flapping permitted directly affects the magnitude of the bending moments at the helicopter rotor hub. As is known to those in the helicopter field, the aircraft is in part controlled by varying the magnitude and sign of these moments. If the rotor hub, blade combination is not designed such that a certain minimum moment may be obtained, difficulty will be encountered in controlling the aircraft. For reasons well known to those in the field, the magnitude of this minimum moment required for single rotor helicopters if much greater than that required for tandem rotor helicopters. At the other extreme, if the moments are permitted to become too large, structural problems are encountered. Either the structure is not sufficiently strong to be able to carry the moment or the weight of the structure required to do so becomes too great. Excessively large moments have generally been a problem in rotor technology.

The ability to flex in the plane of rotation or lead lag is primarily required for structural reasons. In general, it is desirable to have the moments about the vertical or lead lag axis equal to zero as no useful function, such as control, is served by having a greater moment. As in flapping, excessively large moments present structural problems.

One particular problem which has been associated with lead lag has been one of resonance. Through experience it has been found that the first harmonic in-plane natural frequency of the rotor blade, of a bearingless rotor, has been close to the operating RPM of the rotor. This, of course, is an undesirable phenomenon due to the effects of resonance. When this condition is reached the amplitudes of the vibrations become excessive causing passenger discomfort and, in extreme cases, structural falure. It is for this reason that most rotors are designed such that this condition is not encountered during normal operation of the aircraft. Some aircraft currently on the market have their operating RPM greater than the first harmonic in-plane natural frequency of the rotor blade. This results in the aircraft passing briefly through the resonance point during that period of time wherein the rotor is going from a stopped position to its operating RPM and vice versa. Higher levels of vibration are encountered at this point.

As mentioned, the ability to flex in flapping, directly affects hub moments. As the rotor rotates each individual blade generates aerodynamically vertical force which tends to force the blade out of the plane of rotation. Additionally, rotation of the rotor generates a centrifugal force in a horizontal direction tending to force the rotor blade into the plane of rotation. At any point in time these forces are in equilibrium at a particular blade flap angle. If one of the forces changes while the other does not, a new flap angle is inherently achieved so that the forces do reach equilibrium.

All rotors include rotor blades which are effectively hinged to the rotor hub. As used herein, "hinge" refers to any structure which permits the rotor blade to deflect with respect to the rotor hub. In the so-called rigid rotor, or bearingless rotor, the hinge includes a flexible member located at the root of the rotor blade. In the more conventional fully articulated rotor the hinge is a pin assembly. In both systems the resultant of the forces acting on the rotor blade act about the hinge point, i.e., the apex of the flap angle. The moment generated at the hub by a particular blade is a function, in part, of the distance the effective hinge point is displaced from the center of the rotor hub. This is the distance which the forces generated by rotation of the rotor blade act about the hub. Hub moments may be substantially reduced by reducing the distance between the center of the hub and the effective hinge point. The present invention permits significant reduction in the magnitude of this distance.

In the pinned, or fully articulated rotor, there is maximum flexibility of substantially zero stiffness at the hinge point. Consequently, the blade generates no moment at that point. In the bearingless rotor the hinge is not perfectly flexible, therefore, some moment is present at the hinge point. Of course, this moment is also felt at the rotor hub. The magnitude of this moment is generally minimal.

The capability of the rotor blades to deflect with respect to the rotor hub has been introduced in many different ways with different types of hinges. In the articulated rotor the rotor blade is pinned to the rotor hub so as to have the two degrees of freedom which are required. A vertical hinge or pin is located between the rotor blade and the rotor hub so that the blade may angularly deflect in the plane of rotation about the hinge pin. The hinge pin thus provides a discrete pivot point. A second hinge is provided in the horizontal direction so that the rotor blade may flap in and out of the plane of rotation. The location of this pin provides a discrete pivot point for the flapping motion. In addition, the rotor blade is permitted to rotate about its longitudinal axis so that the rotor blade may pitch. Single rotor helicopters with an articulated rotor generally require the flap hinge location to be displaced a distance equal to 6 to 10 percent of the rotor radius from the center of rotation for adequate control response while tandem rotor helicopters only require a 2 to 4 percent hinge offset location. For some tandem rotor helicopter designs a zero offset would be ideal. This is due to the fact that tandem helicopter control is obtained through the differential action of the rotors, therefore requiring no moment at the hub. Pitching motion of the blade is permitted by a pitch bearing located between the blade and the hub.

Although the articulated rotor has been the mainstay of the helicopter industry for many years, it has many recognized disadvantages. The high loads experienced at the hinge require that it have bearing assemblies. These assemblies are a problem because of their high complexity, cost and resulting great weight. Also, maintainability requirements are high and therefore costly.

Another manner in which rotor blades have been connected to rotor hubs for use in helicopters has involved the use of the so-called "hingeless" rotor system. In this type of rotor system, the blade root or shank is a cantilevered single stage flexure which provides flapping and lead-lag motion. The motion is obtained by elastic deformation of the flexure. Pitch motion is obtained through conventional means, i.e., bearings similar to those used with articulated rotors.

Although this connection is a hinge as that term is used herein it has been common practice to refer to it as "hingeless" to distinguish it from the articulated system. This system has found favor in recent years due to its simplicity. Due to its bearingless construction many of the disadvantages of the articulated system have been eliminated. A significant problem with this type of rotor system, however, has been that the effective pivot point about which the flapping motions take place are located a relatively large distance outboard. This has, of course, resulted in greater hub moments. This moment creates problems involving the flying qualities of the aircraft and also requires that the rotor hub and rotor shaft have increased weight. This type of rotor utilizing a single stage flexure has the effective flapping hinge displaced from the center of rotation a distance equal to 15 to 20 percent of the rotor radius. This is higher than the optimum 6 to 12 percent required for control purposes. This type of rotor has, however, been quite successful in reducing complexity, cost and improving reliability and maintainability as compared to a fully articulated single rotor.

The hingeless rotor has not been practical for a tendem rotor due to the extremely large discrepancy between the required flapping hinge location and that provided by the hingeless rotor (2–4 percent vs 15–20 percent). The weight penalty in such applications would be excessive. Accordingly, it appears that this type of system has not been constructed.

SUMMARY OF THE INVENTION

The present invention solves the problem of excessive moments being generated at the rotor hub by a rotor blade. The invention does this for rotors of the hingeless or bearingless type by providing a flexure which connects the rotor blade to the rotor such that the effective pivot point of the flexure is located closer towards the center of rotation of the rotor than has been heretofore accomplished.

The flexure of the present invention consists of three deflectable stages. The first stage is rigidly connected to the rotor hub. The second stage is cantilevered inward towards the center of the rotor and is connected to the outboard end of the first stage. The third stage is cantilevered outward by being connected to the inboard end of the second stage. The stages may bend due to elastic deformation of the material of which they are constructed. Each of these individual stages may thus be viewed as an independent flexure. By attaching them to one another as described, they have been connected in an overlapping series relationship. In each of the embodiments of the invention each stage is, in addition, tubular in shape and concentrically related to the other stages.

Assuming each of the stages is of the same length, which is the same as that of the resulting flexure, the effective length is three times as great as the overall length of the flexure. As will be described it is, in part, in this manner that the distance between the center of rotation of the rotor hub and the effective pivot point of the rotor blade about its effective hinge is reduced.

The effective hinge location is also affected by the fact that the center line of the first stage may be laterally displaced from the center line of the third stage under certain conditions. This results from the fact that the lift and centrifugal force generated by the rotor cause a shear force which results in lateral deflection of the stages. If the shear force is applied when the center lines of the first and third stages are parallel, there will be a lateral displacement of one center line with respect to the other. In operation, however, there will usually be a non-parallel relationship between these center lines. The application of a shear force under such circumstances will result in a shift of the intersection point between the two center lines. As the intersection point of these two center lines defines the effective hinge location it may be readily seen that a lateral displacement of one center line with respect to the other alters the location of the effective hinge.

The flexure has a particular static effective hinge location which is a function of the geometry and materials used in constructing the flexure. When such a flexure is used to connect a rotor blade to a rotor hub and is rotated, the actual effective hinge location at any point in time which is experienced while the rotor is rotating, may be identified as the dynamic effective hinge location. Generally, the dynamic effective hinge location is displaced some distance from the static effective hinge location. The primary difference between the two hinge locations is a direct result of the lateral displacement of the center line of the third stage from that of the first stage. As our main concern is the operating characteristics of the helicopter, the main interest is, therefore, centered on the dynamic effective hinge location and it is, therefore, this location which is the design objective.

The effective hinge location is also directly affected by the number of stages used in constructing the present invention. Each of the embodiments of the invention described herein are shown using three stages as this number will provide an optimum flexure for use in conjunction with single rotor helicopters. A greater number of stages or longer stages would be required in order to construct a flexure of the present invention for use in tandem rotor helicopters as the resulting increased flexibility is needed in order to achieve the optimum effective hinge offset required for use with tandem rotor helicopters. A three stage flexure of the present invention can provide a static effective hinge location as small as 6 percent. A five stage embodiment of the invention can provide a static effective hinge location between 2 and 4 percent. The flexure of the present invention thus makes it possible for bearingless rotors to be used with tandem rotor helicopters.

Therefore, it is an object of the present invention to reduce the distance between the center of rotation of a rotor and the effective pivot point of a rotor blade about its effective hinge.

It is an object of the present invention to provide a flexure for connecting a rotor blade to the rotor of a bearingless rotor wherein the flexure is made up of a plurality of bendable members connected in series and in an overlapping relationship.

A further object of the invention is to provide a flexure for connecting a rotor blade to the rotor of a bearingless rotor wherein the flexure consists of concentrically oriented tubular members of stages connected in series.

Another object of the invention is to provide a flexure for connecting a rotor blade to the rotor of a bearingless rotor wherein the flexure consists of a plurality of stages and wherein rotor blade pitch is achieved without the use of conventional pitch bearings.

Still another object of the invention is to provide a flexure for connecting a rotor blade to the rotor of a bearingless rotor which provides a suitable flexibility and effective hinge location for use in conjunction with tandem rotor helicopters.

Still another object of the invention is to provide a flexure for connecting a rotor blade to the rotor of a bearingless rotor wherein the resonance problem between rotor RPM and rotor blade in-plane natural frequency is minimized.

BRIEF DESCRIPTION OF THE DRAWINGS

FIG. 2 is a top plan view of the flexure of the present invention.

FIG. 3 is a side view along line 3—3 in FIG. 2 of the present invention.

FIG. 6 is a side elevation view of embodiment of the present invention which provides for pitch of the rotor blade through the use of conventional pitch bearings.

FIG. 7 shows another embodiment of the flexure of the present invention wherein the inner and outer stages of the preferred embodiment are reversed.

DESCRIPTION OF THE PREFERRED EMBODIMENTS

Figure 1:
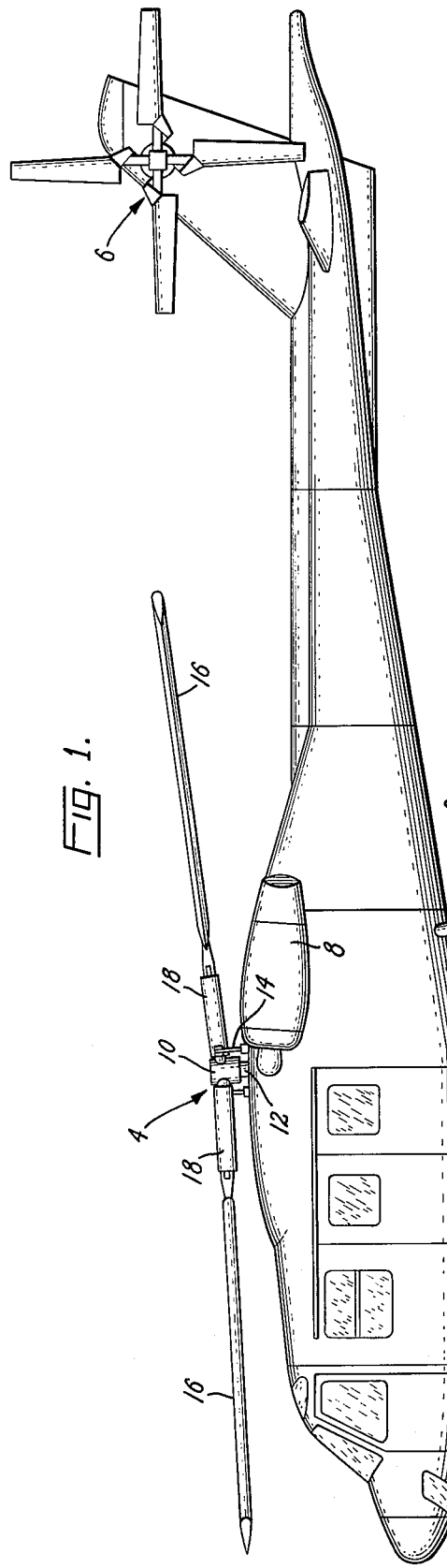
FIG. 1 is a side elevation view of a helicopter having a rotor hub embodying the flexure of the present invention.

This invention relates generally to means for securing a rotor blade to a rotor hub on a rotor craft such as a helicopter. FIG. 1 shows a helicopter incorporating the present invention. A helicopter 2 is shown having a main lifting rotor 4, an anti-torque rotor 6 and engines 8. The rotor 4 includes a hub 10, a rotor shaft 12, pitch links 14 and blades 16. The blades are secured to the hub 10 by the flexures of the present invention 18. During operation the engines 8 cause the rotor shaft 12 to rotate the hub 10. Of course, rotation of the hub 10 causes the blades 16 and the flexures 18 to rotate also. Control of the aircraft is effected by changing the pitch of the rotor blades 16. Operation of the appropriate cockpit controls results in axial movement of the pitch links 14 which cause the blades to pitch.

Figure 4:
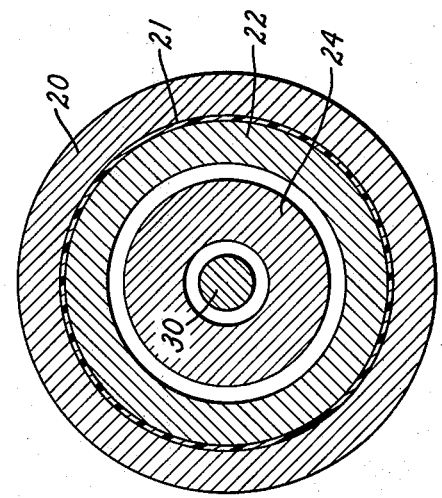
FIG. 4 is a cross section view along line 4—4 in FIG. 3, of the present invention.

Reference will now be made to FIGS. 2, 3 and 4 which show an embodiment of the invention.

The flexure 18 shown in the FIGURES is made of an outer stage 20, a middle stage 22 and an inner stage 24. The rotor blade 16 is securely connected to the flexure 18 by pins 26 passing both through the blade 16 and the outer stage 20.

All three stages are shown as cylinders or tubes, having a circular cross section. As will be made apparent, other cross sectional shapes may be used. Although tubes are used in all the embodiments described herein, it is to be understood that "stage" as used herein means any structural member. Tubes have been selected for the preferred embodiments due to various engineering design considerations. The tubular shape permits the stages to be concentrically oriented, thus placing the center lines of the stages in close proximity to one another resulting in lower stresses within the flexure. This concentric orientation of the two tubular stages results in the inner ones being protested from the external environment by the outermost one. As will be described subsequently in more detail, chambers formed between adjacent stages makes the flexure adaptable to various methods of damping.

The outer stage 20 is concentrically mounted about the middle stage 22. The outer stage 20 is connected at its inboard end to the outboard end of the middle stage 22 using an elastomeric bearing 21. This bearing permits the outer stage to move a small distance axially with respect to the middle stage, while at the same time preventing rotation of one stage with respect to the other. The middle stage 22 is, in turn, rigidly mounted concentrically about the inner stage 24; the outboard end thereof being rigidly connected to outboard end of the inner stage 24. This may be accomplished by any suitable connecting means, such as by bolting, bonding or welding. Bolts 25 are shown in FIG. 3 connecting the middle stage 22 to the inner stage 24. It is possible that the middle and inner stages may be constructed in an integral manner thereby avoiding the need for separate connective components. The inner stage 24 is rigidly connected at its inboard end to the hub 14. One manner in which this may be accomplished, as is shown in the FIGURES, is for the inner stage 24 to be structurally an integral part of the hub.

Centrifugal force generated by the rotation of the rotor causes the flexure to be loaded axially. This tension loading of the flexure 18 would, if provisions were not otherwise made, subject the middle stage to intensive compressive loading. As cylinder 22 may be structurally unstable under compressive loading, means other than the flexure 18 are used to absorb the tension loads which would otherwise be carried by the flexure 18. A conventional tension-torsion strap 30 is used to absorb the tension loading induced by centrifugal force while at the same time permitting the blade to pitch. Since the flexure carries no tension loads, the middle stage 22 does not have to withstand any compressive loading.

The tension-torsion strap 30 is connected both to the rotor blade 16 and the hub 10. The strap passes through the center of the tubular inner stage 24 and is connected to the blade through the use of pin 26 which also connects the rotor blade to the outer stage 20 of the flexure. The inboard end of the strap is connected to the hub 10 by pins 34.

In order to assure that the tension-torsion strap absorbs these forces it is necessary to permit some axial displacement within the flexure 18. If this were not done the tension on the tension-torsion strap would cause it to elongate thereby resulting in the flexure absorbing some of the loads. By permitting the flexure 18 to elongate or displace axially substantially all of the tension loads will be carried by the tension-torsion strap 30.

Axial displacement of the flexure 18 is accomplished by permitting one stage to slide with respect to another. The outer stage, for instance, may be permitted to slide with respect to the middle stage or the middle stage may be permitted to slide with respect to the inner stage. It is arbitrary as to which location is selected. As previously indicated, the juncture between the outer and middle stages has been selected for the preferred embodiment. This capability is provided by the elastomeric bearing 21 which is located between the outer and middle stages. The bearing is bonded to these stages using conventional manufacturing techniques. Embedded in the elastomeric material are metal wires or windings oriented such that the wire center lines are perpendicular to the pitch axis. As a result of this construction, axial loading of the flexure 18 causes the windings to be compressed against one another, resulting in the desired slippage. This construction is very rigid, however, with respect to torsional loads as this type of loading is resisted by the windings.

Pitching motion of the rotor blade about its longitudinal axis is permitted by the inherent twisting capability of the tension-torsion strap 30 and the capability of the middle and inner stages to elastically deflect in torsion. A pitch link 14 in universally mounted to the outer stage 20. The other end of the pitch link 14, not shown, is connected to the control system of the helicopter. Control inputs cause the pitch link to move which in turn causes the outer stage 20 to rotate. Rotation of the outer stage in addition to causing the blade 16 to rotate causes the middle stage 22 to rotate as a result of the torque passes thereto by the elastomeric bearing 21. This torque causes both the middle and inner stages to torsionally deflect. By permitting this angular or torsional deflection through use of the elastic deformation characteristics of the two stages the pitch bearings which are normally used to permit such movement are eliminated.

In describing how the present invention reduces the moments acting at the rotor hub 14 reference will be made to FIGS. 5a and 5b, which depict the present invention in schematic form. The rotor blade 16 is shown connected to the rotor hub 14 by the flexure of the present invention. The individual stages of the flexure are represented by solid lines and may be considered the center lines of the three stages. They are designated by the letters $a$, $b$ and $c$. The length of each of the individual stages $a$, $b$ and $c$ and the overall length of the entire flexure is represented by the letter $x$. The effective hinge location is designated by the letter $e$. The advantages of the present invention may be utilized with respect to moments in two different planes, flapping and lead lag. Since the basic principles are the same, the description which follows will, for purposes of simplicity, be directed towards the flapping moments.

The primary factor affecting the magnitude of the moment acting at the rotor hub 14 is the length of the moment arm between the hub and the forces generated by the rotor blade 16. For rotors of the hingeless type the magnitude of the couple which is passed from the rotor blade to the hub is minimal, as a flexure is not a perfect hinge and does therefore pass some moment. Although the magnitude of this component of the total moment is varied by the stiffness of the flexure it is, in general, negligible compared to the total moment.

The effective hinge location is directly affected by the stiffness of the rotor blade hub combination. A very stiff blade rigidly connected to a hub will have an effective hinge location which is displaced a relatively large distance outboard from the hub. This is due to the fact that since the combination is stiff the blade itself will act as a moment arm and the forces may be viewed as acting at the center of lift of the blade, a point considerably outboard of 25 percent blade radius point. If the root of the blade is made quite flexible the forces generated by the blade will act at the center of that region of flexibility. This flexible area may be viewed as a hinge and the center of this region flexibility may be considered the effective hinge location. This location may be considered the point at which the center line of the blade intersets a radian extending from the hub arm to which that particular blade is attached.

The stiffness of a structural member and hence the amount which it will deflect under a given load is a direct function of its flexural rigidity constant EI, where E is the modulus of elasticity, a constant for a given material, and I is the moment of inertia of the structure, a constant for a given shape. The effective hinge of a particular flexure of uniform cross section may be considered located at its mid point. This effective hinge location of a flexure is used for discussion purposes only, as the location for the flexure in combination with a rotor blade may be somewhat different due to the elastic properties of the rotor blade itself.

The EI of a particular single stage flexure will be a constant value $EI_k$ and the flexure will have length $x$. The multiple stage construction of the present invention permits $x$ to be greatly reduced by providing a flexure having the same effective EI, i.e., $EI_k$; yet with the EI of the individual stages greater than $EI_k$. This is due to the fact that the relationship between EI of the individual stages and the effective EI of the combination is as follows:

$$\frac{1}{EI_a} + \frac{1}{EI_b} + \frac{1}{EI_c} = \frac{1}{EI_k}$$

where $a$, $b$ and $c$ represent the stages of the flexure

Thus the moment of inertia or I of the individual stages are greater than the effective $I_k$ of the three stages together when combined. This means that the individual stages are stiffer than the sole member of a single stage flexure. By combining the three stages in series to obtain the same overall degree of stiffness the effective length of the resulting flexure taken along the center line of the individual stages is increased to compensate for the increased stiffness of the individual stages. Although the effective length is increased the overall length of the flexure is, due to the series connection, no greater than the actual length of any of the three individual stages. Thus, in decreasing the overall length of the flexure, the distance the effective hinge is displaced from the center of rotation of the hub is moved inboard thereby reducing the moment arm.

Figure 5A:
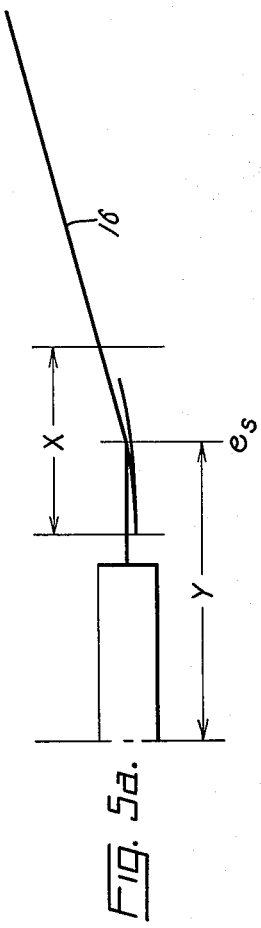
FIG. 5a is a schematic drawing of the flexure of the present invention showing the static effective hinge location.
Figure 5B:
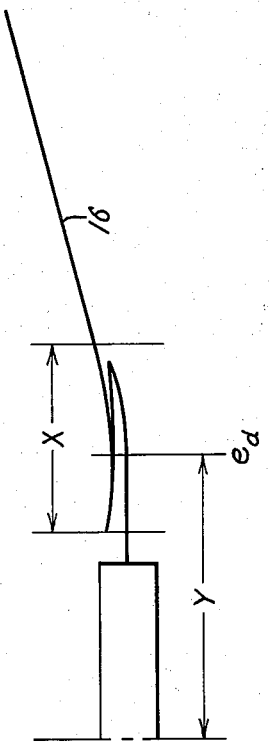
FIG. 5b is a schematic drawing of the flexure of the present invention showing the dynamic effective hinge location.

This structure is shown schematically in FIGS. 5a and 5b where the individual stages are designated a, b and c. If each of the individual stages has the same EI and the flexure is subjected to a couple, the effective hinge e of the flexure will be at its mid-point. This point is displaced a distance y from the center of rotation of the hub or y represents the moment arm. This mid-point location $Y_s$ may be considered the static effective hinge location of the flexure. The static hinge location $Y_s$ is determined by the EI of the flexure and not influenced by any structural loading of the flexure. It is located at the mid-point of the flexure in this example only because each of the individual flexures were, in part, assumed to have the same uniform EI.

The actual effective hinge location of the present invention when in use is altered by another factor. When the rotor is rotating, the flexure is structurally loaded both due to aerodynamic and centrifugal forces. One component of the resultant of these forces is a shear force which is perpendicular to the center line of the flexure. As may be seen in FIG. 5b this shear force causes the center line of the outer stage a to be laterally displaced from the plane of rotation of the hub thus causing their intersection point, which is the effective hinge location, to be displaced inward. This effective hinge point may be referred to the dynamic effective hinge point $e_d$ and is usually displaced inward from the static effective hinge location. As the position of the dynamic effective hinge point is a function of the shear force which is, in turn, a function of lift, the location $Y_d$ will vary as the blade rotates. This is due to the fact that the lift generated by a blade is greater on the advancing side as opposed to the retreating side. Thus, it may be seen that for a given operating condition the effective hinge location will vary sinusoidally with rotor RPM about a mean position displaced from the static effective hinge location. Of course, this mean position is a function of the average lift required for that particular operating condition; therefore, the mean position will vary with the operating condition of the helicopter.

The static effective hinge location $Y_s$ for a rotor blade flexure combination is given by the following formula:

$$Y_s = \frac{f^2 - 1}{f^2 + \frac{1}{2}}$$

where $f$ is the first elastic flapping frequency divided by $\Omega$ where $\Omega$ is in turn equal to the number of operating revolutions per minute of the rotor divided by 60. The location given by this formula is different than the flexure mid-point due to the elastic property of the blade itself. For a particular blade and single stage flexure combination $Y_s = 0.207r$ or 20.7 percent where $r$ is the radius of the rotor. For the same blade using the flexure of the present invention $Y_s = 0.1125r$ or 11.25 percent, a considerable decrease.

The resonance problem associated with bearingless single rotor helicopters wherein the rotor operating RPM is near the inplane natural frequency of the blade may be minimized by the present invention by altering the flexibility of the blade hub combination in lead-lag mode. The present invention in addition to altering the effective hinge location changes the inplane natural frequency of the blade. Whether this change is sufficient to avoid the in-plane resonance problem is a function of the particular design under consideration. The altering of the in-plane natural frequency may be at the expense of other design objectives. At a minimum, the present invention reduces the resonance problem to a level where it can be tolerated through the use of damping. As will be subsequently discussed, the present invention inherently provides greater damping than the single stage flexures of the prior art bearingless rotors. This is due to the fact that in addition to structural damping characteristic of all structures, the present invention inherently provides viscous damping due to the air filled cavities formed between the various stages.

As is obvious to one skilled in the art, there are many different ways in which a particular degree of stiffness or flexibility may be incorporated into a stage of the present invention. The degree of flexiblity of any structural member may be varied by changing the material that it is made of, its cross-sectional shape, its length and the thickness of the members. Each of these techniques and others are available to the designer in constructing a flexure of the present invention. As the flexure of the present invention is a multi-stage member, each of these techniques and others may be applied to the individual stages. In other words, each of the stages may be of a different length, material, cross-sectional shape and have a different and non-uniform thickness. The particular techniques used by the designer are discretionary within the engineering constraints of a particular flexure design.

Flexures of the present invention may be designed such that the flexibility characteristics in flapping are different from those in the plane of rotation. This may be accomplished by using some of the techniques described above. If one or more of the tubular stages are made thicker at their upper and lower portions, the flexure will be stiffer with respect to flapping motions as compared with lead lag motions in the plane of rotation. If the stages are oval shaped and the major axis of the oval lies in the plane of rotation, the flexure will be stiffer with respect to lead lag compared to flapping. These and other techniques may be used to vary the flexibility characteristics of a flexure of the present invention in both flap and lead lag direction.

Flexibility, and hence effective hinge location are, as previously discussed, effected by the number of stages or the length of the stages used in the present invention. Three stages provide an appropriate degree of flexibility for use with single rotor helicopters. A three stage flexure can provide a static effective hinge location between 6 to 12 percent of the blade radius from the center of rotation. The precise location being a function of the other factors previously discussed. The effective hinge location for a tandem rotor helicopter must be located much closer to the center of rotation of the rotor than is necessary for a single rotor helicopter. For this reason a greater degree of flexibility is required for the flexure of the present invention when applied to tandem rotor helicopters. A static effective hinge location of 2 to 4 percent suitable for tandem rotor helicopter operation can be obtained if five stages are used. The precise hinge location is, of course, determined by other factors.

The present invention, as previously indicated, eliminates the pitch bearings by making use of the elastic capability of the flexure in torsion and thereby provides means for blade pitch angle changes. The degree of angle change permitted is, in part, a direct function of the length of the flexure; a longer flexure providing a greater amount of change in pitch. As it is highly desirable to reduce the length of the flexure and thereby shorten the effective hinge location the amount of pitch change permitted by the flexure tends to be minimized. Of course, the degree of pitch angle change permitted is increased through the use of a greater number of stages. It is contemplated that for certain requirements the length of the flexure necessary to provide the desired hinge location will be such that the requisite amount of angle change will not be achieved.

This problem is solved by the embodiment of the invention shown in FIG. 6. In this particular embodiment of the invention the elastic torsional capabilities of the stages are not used to change the pitch of the blade 16, instead conventional pitch bearings 32 are used. The bearings are shown located between the outer and middle stages. The bearing assembly could be located between the middle and inner stages where moments are lower but is not, as assembly would then be difficult. Additionally, location in the outer position would be more difficult. An elastomeric bearing 21 is not used at the juncture between any two stages of this embodiment as there is enough axial movement permitted by the roller type bearing assembly. As previously mentioned, this axial movement is necessary so as to permit the tension-torsion strap 30 to carry substantially all of the axial or tension loads.

Many different materials may be used for the stages of the present invention. The torsional deflection characteristics of these materials are of particular importance for the embodiment of the invention which does not use conventional pitch bearings. Composite materials are particularly suited for this type of application. Those generally in use today use a fibrous material embedded in a second, glue-like, material. Fiberglass and boron filaments have been used as the fiber-like material. Various commercially available resins have been used as the glue or bonding material.

Uni-directional fibers refer to those layers of fibers in composition materials wherein the fibers are parallel to one another or run in the same direction. Crossply layers are layers of uni-directional fibers wherein one layer is positioned at an angle to the other layer.

Composite materials are known to be very rigid in a direction parallel to the fiber orientation. In manufacturing a stage for the flexure of the present invention which will provide torsional deflection capability, it is desirable to have unidirectional layers oriented parallel to the blade longitudinal axis for purposes of axial strength. In order to obtain torsional stiffness unidirectional layers must be positioned at an angle with respect to the longitudinal axis. Maximum torsional deflection strength is obtained by having layers of uni-directional material located at plus and minus 45°, from the longitudinal axis of the blade or 90° to each other.

In the embodiment of the invention shown in FIG. 3 only the two inner stages require a capability to deflect in torsion. This is due to the fact that the pitch arm is connected to the inboard and outer stage. Only uni-directional layers would thus be used but for the fact that when this is done, delamination of the individual fibers in each layer occurs. Accordingly, cross-ply layers are used having an angle in the range of 5° to 10° between layers in manufacturing the two inner stages. An angle of 90° between layers or 45° between each layer in the longitudinal axis, is used in manufacturing the outer stage so as to obtain maximum torsional strength.

FIG. 7 shows another embodiment of the invention. In this embodiment the orientation of the stages is reversed compared to the other embodiments discussed herein. The outer stage 40 forms a portion of the hub 14. The middle stage 42 is cantilevered inwardly from the outboard end of the outer stage and is concentrically oriented within the outer stage. The outer and middle stages are rigidly connected by bolts 43, or, in the alternative, may be bonded. The inner stage 44 is cantilevered outward from the inboard end of the middle stage 42. Axial slippage is permitted between the middle stage 42 and the inner stage 44 by an elastomeric bearing 21 so that the tension-torsion strap may absorb the centrifugal forces generated by rotation of the hub. The rotor blade 16 is rigidly connected to the inner stage 44 by pins 45 and may, if desired, form an integral part thereof. A tension-torsion strap 46 is connected to the inner stage 44 while the other end is connected to the inner stage 44 while the other end is connected to the hub 14.

Rotation of the blade about its longitudinal axis may be accomplished through the use of a bearing assembly or through the use of the torsional deflecting characteristics of the stages. For purposes of simplicity the bearing assembly is not shown in the drawing of this embodiment.

The prime advantage of this embodiment of the invention is that it permits the rotor blade pitch controls to be located inside the rotor hub as opposed to the external location shown with respect to the other embodiments. In this embodiment the pitch link 14 is universally connected to the inner stage 44 at its inboard end within the hub 10. The other end of the pitch link 14 is connected to an actuator not shown. This has the advantage of providing a more compact system of blade pitch controls. For military applications the embodiment provides a control system which is protected from ballistic impacts which could sever the control linkages and result in loss of control of the aircraft.

Under certain circumstances it is desirable to add damping to the rotor system. This is particularly a problem with respect to instabilities in the plane of rotation. It is common for articulated rotors of the prior art to have lead lag dampers. Some so-called hingeless rotors currently in use have had vibration problems associated with this particular mode of vibration. The cause of this particular problem is that frequently it turns out that the in-plane natural frequency of the blade hub combination is close to the operating rotor RPM, or a multiple thereof. This, of course, results in a resonance problem wherein undesirable vibrations are set up in the rotor blade hub combination. This particular problem may be overcome by adding damping to the system. The damping absorbs the vibrations or, at a minimum, limits their amplitudes to acceptable levels. The present invention has inherently greater damping characteristics than the single stage hingeless rotors of the prior art. In addition, the present invention is particularly adaptable so that further increased damping may be easily obtained.

The inherent damping of the present invention is shown in the embodiment of the invention shown in FIG. 6. Cavities are formed between the outer stage 20 and the middle stage 22, the middle stage 22 and the outer stage 20, and between the inner stage and the tension torsion strap. During operation of the rotor the stages of the flexures move relative to each other and the tension torsion strap, thus causing air to move back and forth from one side of the flexure to the other. This movement of the air provides a degree of viscous damping.

The viscous damping may be further increased by using a fluid other than air and having greater viscosity, such as oil. One manner in which this may be accomplished is by providing a chamber 102 in a plug 100 which is located in the rotor hub. The chamber 102 may be sealed to prevent fluid from escaping. This chamber or reservoir 102 is partially filled with a fluid such as oil which partially fills the cavity formed by the tubular stages. The viscous properties of the oil and the inherent resistance to passage of oil from one side of the flexure to the other side serves to provide the desired damping characteristics for the flexure 18. These characteristics may be varied by using different types of fluids.

While the invention has been illustrated and disclosed with reference to preferred embodiment, it is to be understood that various changes and modifications may be made to the invention as disclosed without departing from the spirit of the invention.

What is claimed is:

1. In a rotor for a rotor craft having a rotor hub with a rotor blade mounted thereto, a flexure for mounting the rotor blade to the rotor hub so as to permit flapping, lead lag and pitch, which comprises:
    a tubular first stage having one end thereof rigidly connected to the rotor hub extending radially therefrom;
    a tubular second stage having one end thereof rigidly connected to the remaining end of said first stage, oriented concentrically about said first stage and extending radially toward the hub;
    a tubular third stage having one end thereof mounted to the remaining end of said second stage so that axial movement therebetween may take place, said third stage mounted concentrically about said second stage, the remaining end of said third stage rigidly connected to the rotor blade; and
    a tension-torsion strap mounted concentrically within said first stage connected at one end to the rotor hub and connected at the other end to the rotor blade for restraining axial movement and bearing tension loads therebetween.

2. The flexure of claim 1 which further includes an elastomeric bearing connected to said second stage and to said third stage so as to permit axial movement therebetween.

3. The flexure of claim 1 which further includes a viscous fluid interposed in the chambers formed within said first stage, between said first stage and said second stage, and between said second stage and said third stage whereby damping is provided.

4. The flexure of claim 1 which further includes a bearing assembly interposed between said second stage and said third stage so as to permit rotation therebetween.

5. In a rotor for a rotor craft having a rotor hub with a rotor blade mounted thereto, a flexure for mounting the rotor blade to the rotor hub so as to permit flapping, lead lag and pitch, which comprises:
    a tubular third stage having one end thereof rigidly connected to the rotor blade extending radially therefrom;
    a tubular second stage having one end thereof rigidly connected to the remaining end of said third stage so that axial movement therebetween may take place, said second stage mounted concentrically about said third stage and extending radially away from the hub;
    a tubular first stage having one end thereof mounted to the remaining end of said second stage said first stage mounted concentrically about said second stage, the remaining end of said first stage rigidly connected to the rotor hub; and
    a tension-torsion strap mounted concentrically within said third stage connected at one end to the rotor hub and connected at the other end to the rotor blade for restraining axial movement and bearing tension loads therebetween.

* * * * *